United States Patent
Shubhi et al.

(10) Patent No.: US 12,273,880 B2
(45) Date of Patent: Apr. 8, 2025

(54) METHODS FOR DETERMINING MINIMUM SCHEDULING OFFSET APPLICATION DELAY

(71) Applicant: Telefonaktiebolaget LM Ericsson (publ), Stockholm (SE)

(72) Inventors: Ilmiawan Shubhi, Malmö (SE); Ajit Nimbalker, Fremont, CA (US); Ravikiran Nory, San Jose, CA (US); Sina Maleki, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 363 days.

(21) Appl. No.: 17/775,160

(22) PCT Filed: Nov. 6, 2020

(86) PCT No.: PCT/EP2020/081398
§ 371 (c)(1),
(2) Date: May 6, 2022

(87) PCT Pub. No.: WO2021/089858
PCT Pub. Date: May 14, 2021

(65) Prior Publication Data
US 2022/0417970 A1    Dec. 29, 2022

Related U.S. Application Data

(60) Provisional application No. 62/933,116, filed on Nov. 8, 2019.

(51) Int. Cl.
*H04W 72/1273* (2023.01)
*H04L 27/26* (2006.01)
(Continued)

(52) U.S. Cl.
CPC ... *H04W 72/1273* (2013.01); *H04L 27/26025* (2021.01); *H04W 24/08* (2013.01); *H04W 72/0446* (2013.01); *H04W 72/23* (2023.01)

(58) Field of Classification Search
CPC . H04W 72/1273; H04W 72/23; H04W 24/08; H04W 72/0446; H04L 27/26025
See application file for complete search history.

(56) References Cited

U.S. PATENT DOCUMENTS 11,375,518 B2 *   6/2022   Lin .................... H04L 5/0053
11,799,615 B2 *  10/2023   Ang ................... H04L 5/0053

OTHER PUBLICATIONS

Japanese Office Action and English machine translation dated Jun. 26, 2023 for Application No. 2022-526494, consisting of 8 pages.
(Continued)

*Primary Examiner* — Chandrahas B Patel
(74) *Attorney, Agent, or Firm* — Weisberg I.P. Law, P.A.

(57) ABSTRACT

A method, system and apparatus for methods for determining minimum scheduling offset application delay are disclosed. According to one aspect, a method in a network node includes determining an application delay based at least in part on a first subcarrier spacing, SCS, associated with a scheduling component carrier bandwidth part, BWP, the application delay being associated with at least one of the first and second minimum scheduling offsets. According to another aspect, a method in a wireless device includes receiving an indication of an application delay from a network node, the application delay being based at least in part on a first subcarrier spacing, SCS, associated with a scheduling component carrier bandwidth part, BWP, and the application delay being associated with at least one of the first and second minimum scheduling offsets.

20 Claims, 8 Drawing Sheets

(51) Int. Cl.
*H04W 24/08* (2009.01)
*H04W 72/0446* (2023.01)
*H04W 72/23* (2023.01)

(56) References Cited

OTHER PUBLICATIONS

3GPP TSG-RAN WG1 Meeting #98bis Tdoc R1-1911010; Title: Cross-slot scheduling technique; Agenda Item: 7.2.9.2; Source: Ericsson; Document for: Discussion and Decision; Location and Date: Chongqing, China, Oct. 14-20, 2019, consisting of 7 pages.
3GPP TSG RAN WG1 #98 R1-1910498; Title: Cross-slot scheduling power saving techniques; Agenda Item: 7.2.9.2; Source: Samsung; Document for: Discussion/Decision; Location and Date: Chongqing, China, Oct. 14-18, 2019, consisting of 13 pages.
3GPP TSG RAN WG1 Meeting #98bis R1-1910077; Title: Procedure of cross-slot scheduling for UE power saving; Agenda Item: 7.2.9.2; Source: Huawei, HiSilicon; Document for: Discussion and Decision; Location and Date: Chongqing, China, Oct. 14-20, 2019, consisting of 14 pages.
International Search Report and Written Opinion dated Feb. 10, 2021 for International Application No. PCT/EP2020/081398 filed Nov. 6, 2020, consisting of 14-pages.
3GPP TSG RAN WG1 Meeting #97 R1-1907918 (190XXXX); Title: Summary of Cross-slot Scheduling Power-Saving Techniques; Agenda Item: 7.2.9.2; Source: MediaTek Inc.; Document for: Decision; Date and Location: May 13-17, 2019, Reno, NV, USA, consisting of 26-pages.
3GPP TSG RAN WG1 Meeting #98 R1-1908606; Title: Power saving scheme with cross-slot scheduling; Agenda Item: 7.2.9.2; Source: CATT; Document for: Discussion and Decision; Date and Location: Aug. 26-30, 2019, Prague, CZ, consisting of 5-pages.
Communication Pursuant to Article 94(3) EPC dated Oct. 10, 2024, issued in corresponding European Patent Application No. 20 804 483.4, consisting of 7 pages.
3GPP TSG RAN WG1 Meeting #98bis R1-1911494; Title: FL summary#2 on A-CSI-RS triggering with different numerology between CSI-RS and triggering PDCCH; Agenda item: 7.2.13.4; Source: Nokia, Nokia Shangai Bell; Document for: Discussion; Location and Date: Chongqing, P.R. China, Oct. 14-20, 2019; consisting of 8 pages.

* cited by examiner

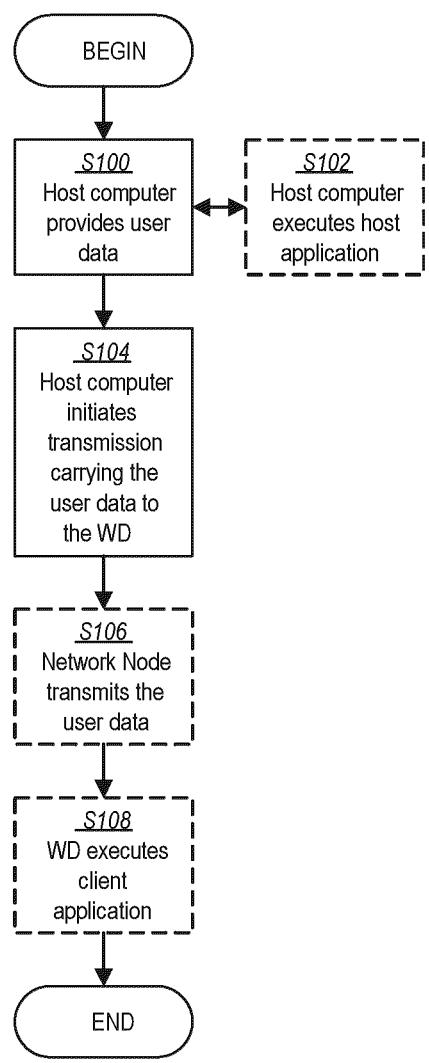
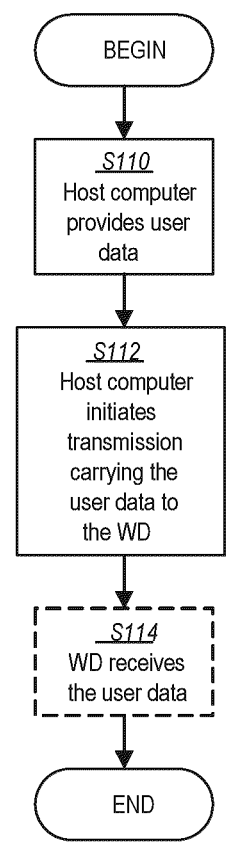
FIG. 3
FIG. 4

US 12,273,880 B2

METHODS FOR DETERMINING MINIMUM SCHEDULING OFFSET APPLICATION DELAY

CROSS-REFERENCE TO RELATED APPLICATIONS

This application is a Submission Under 35 U.S.C. § 371 for U.S. National Stage Patent Application of International Application No.: PCT/EP2020/081398, filed Nov. 6, 2020 entitled "METHODS FOR DETERMINING MINIMUM SCHEDULING OFFSET APPLICATION DELAY," which claims priority to U.S. Provisional Application No. 62/933,116, filed Nov. 8, 2019, entitled "METHODS FOR DETERMINING MINIMUM SCHEDULING OFFSET APPLICATION DELAY," the entireties of both of which are incorporated herein by reference.

TECHNICAL FIELD

The present disclosure relates to wireless communications, and in particular, to determining minimum scheduling offset application delay.

BACKGROUND

One of the power-consuming activities of a wireless device in an RRC_CONNECTED mode is monitoring the physical downlink control channel (PDCCH). Considering this, PDCCH monitoring should be conducted in an efficient manner. One of the methods of doing an effective PDCCH monitoring is by setting the scheduling to the cross-slot mode. When cross-slot scheduling is used, the wireless device does not need to perform physical downlink shared channel (PDSCH) buffering after the last symbol of the PDCCH and could go to microsleep earlier in the respective slot.

In Release (Rel.) 16, of the Third Generation Partnership Project (3GPP), this feature is supported by an introduction of the minimumSchedulingOffset parameter which is configured in radio resource control (RRC) per bandwidth part (BWP). In the downlink (DL), the minimumSchedulingOffset represents the minimum offset of the scheduling PDCCH and its scheduled PDSCH or aperiodic channel state information reference signals (CSI-RS). In the uplink, the minimumSchedulingOffset represents the minimum offset of the scheduling PDCCH and its scheduled physical uplink shared channel (PUSCH) or aperiodic sounding reference signal (SRS). Having this configuration, the wireless device may know in advance whether the wireless device will always be scheduled using cross-slot scheduling or not.

While it is beneficial from the power-consumption perspective, always using cross-slot scheduling is not beneficial when a data burst arrives. From the network node perspective, having a minimumSchedulingOffset value larger than 0 will limit the scheduling flexibility. From the wireless device perspective, this may provide additional delay. Therefore, it may be beneficial if the wireless device and the network node can switch between cross-slot mode (i.e., minimumSchedulingOffset>0) and same-slot mode (i.e., minimumSchedulingOffset=0 or disabled).

In 3GPP Rel. 16, an additional bit-field on the downlink control information (DCI) is introduced. Using this bit-field, the wireless device could switch between cross-slot mode and same-slot mode and thus, could obtain optimum trade-off in power-consumption and delay.

However, existing arrangements are lacking.

SUMMARY

Some embodiments advantageously provide methods, network nodes and wireless devices for methods for determining minimum scheduling offset application delay.

According to an aspect of the present disclosure, a method performed by a network node is provided. The method is for transitioning between a first minimum scheduling offset and a second minimum scheduling offset in which multiple numerologies are applied. The method includes determining an application delay based at least in part on a first subcarrier spacing, SCS, associated with a scheduling component carrier bandwidth part, BWP, the application delay being associated with at least one of the first and second minimum scheduling offsets.

In some embodiments of this aspect, determining the application delay comprises determining the application delay further based at least in part on the first minimum scheduling offset, the first minimum scheduling offset being a currently applied minimum scheduling offset. In some embodiments of this aspect, the application delay corresponds to converting between a second scheduling mode and a first scheduling mode, the first and second scheduling modes being different at least in the respective minimum scheduling offset. In some embodiments of this aspect, the second scheduling mode is a cross-slot mode in which the minimum scheduling offset is greater than zero, and the first scheduling mode is a same slot mode in which the minimum scheduling offset parameter is equal to zero.

In some embodiments of this aspect, determining the application delay for cross-carrier scheduling with a mixed numerology comprises when the first SCS associated with the scheduling component carrier BWP and a second subcarrier spacing, SCS, associated with a scheduled component carrier BWP are different, determining a normalized value for the first minimum scheduling offset of the scheduled component carrier BWP relative to the first SCS associated with the scheduling component carrier BWP.

In some embodiments of this aspect, the normalized value, minK', is determined by:

$$\mathrm{min}K' = \mathrm{min}K \cdot \frac{2^{\mu_{PDCCH}}}{2^{\mu_{PDSCH}}}$$

wherein minK is a currently applied minimum scheduling offset;
$\mu_{PDCCH}$ is associated with the first SCS, the first SCS being associated with a scheduling physical downlink control channel, PDCCH; and
$\mu_{PDSCH}$ is associated with the second SCS, the second SCS being associated with a scheduled physical downlink shared channel, PDSCH.

In some embodiments of this aspect, determining the application delay comprises determining a minimum feasible application delay, Z; and when an associated physical downlink control channel, PDCCH, monitoring occasion comes after a specific symbol within a slot, increasing the minimum feasible application delay by a specific amount. In some embodiments of this aspect, the specific amount is 1 slot. In some embodiments of this aspect, determining the application delay comprises determining a currently applied minimum scheduling offset as the application delay based at least in part on the first SCS associated with the scheduling component carrier BWP and a second subcarrier spacing, SCS, associated with a scheduled component carrier BWP.

In some embodiments of this aspect, the method further includes transmitting an indication of the determined application delay to the wireless device. In some embodiments of this aspect, the determined application delay indicates when to start applying the second minimum scheduling offset after a change indication is received by the wireless device, the change indication indicating to apply a new minimum scheduling offset. In some embodiments of this aspect, determining the application delay comprises determining the application delay based at least in part on a currently applied minimum scheduling offset in the scheduled component carrier BWP, a minimum feasible application delay, Z, of the scheduling component carrier BWP, the first SCS associated with the scheduling component carrier BWP and a second subcarrier spacing, SCS, associated with a scheduled component carrier BWP. In some embodiments of this aspect, the determined application delay is based at least in part on a type of physical downlink control channel, PDCCH, monitoring case.

According to another aspect of the present disclosure, a method performed by a wireless device is provided. The method is for transitioning between a first minimum scheduling offset and a second minimum scheduling offset in which multiple numerologies are applied. The method includes receiving an indication of an application delay from a network node, the application delay being based at least in part on a first subcarrier spacing, SCS, associated with a scheduling component carrier bandwidth part, BWP, and the application delay being associated with at least one of the first and second minimum scheduling offsets; and starting to apply the second minimum scheduling offset based at least in part on the received application delay.

In some embodiments of this aspect, the application delay is further based at least in part on the first minimum scheduling offset, the first minimum scheduling offset being a currently applied minimum scheduling offset. In some embodiments of this aspect, the application delay corresponds to converting between a second scheduling mode and a first scheduling mode, the first and second scheduling modes being different at least in the respective minimum scheduling offset. In some embodiments of this aspect, the second scheduling mode is a cross-slot mode in which the minimum scheduling offset is greater than zero, and the first scheduling mode is a same slot mode in which the minimum scheduling offset parameter is equal to zero.

In some embodiments of this aspect, the application delay is for cross-carrier scheduling with a mixed numerology; and when the first SCS associated with the scheduling component carrier BWP and a second subcarrier spacing, SCS, associated with a scheduled component carrier BWP are different, the application delay being further based at least in part on a normalized value for the first minimum scheduling offset of the scheduled component carrier BWP relative to the first SCS associated with the scheduling component carrier BWP.

In some embodiments of this aspect, the normalized value, minK', is determined by:

$$minK' = minK \cdot \frac{2^{\mu_{PDCCH}}}{2^{\mu_{PDSCH}}}$$

wherein minK is a currently applied minimum scheduling offset;

$\mu_{PDCCH}$ is associated with the first SCS, the first SCS being associated with a scheduling physical downlink control channel, PDCCH; and $\mu_{PDSCH}$ is associated with the second SCS, the second SCS being associated with a scheduled physical downlink shared channel, PDSCH.

In some embodiments of this aspect, the application delay is based at least in part on a minimum feasible application delay, Z; and when an associated physical downlink control channel, PDCCH, monitoring occasion comes after a specific symbol within a slot, the minimum feasible application delay is increased by a specific amount. In some embodiments of this aspect, the specific amount is 1 slot. In some embodiments of this aspect, the application delay is a currently applied minimum scheduling offset based at least in part on the first SCS associated with the scheduling component carrier BWP and a second subcarrier spacing, SCS, associated with a scheduled component carrier BWP. In some embodiments of this aspect, the determined application delay indicates when to start applying the second minimum scheduling offset after a change indication is received by the wireless device, the change indication indicating to apply a new minimum scheduling offset.

In some embodiments of this aspect, the method further includes receiving the change indication via a downlink control information, DCI, message. In some embodiments of this aspect, the application delay is based at least in part on a currently applied minimum scheduling offset in the scheduled component carrier BWP, a minimum feasible application delay, Z, of the scheduling component carrier BWP, the first SCS associated with the scheduling component carrier BWP and a second subcarrier spacing, SCS, associated with a scheduled component carrier BWP. In some embodiments of this aspect, the application delay is based at least in part on a type of physical downlink control channel, PDCCH, monitoring case.

According to yet another aspect of the present disclosure, a network node is provided for transitioning between a first minimum scheduling offset and a second minimum scheduling offset in which multiple numerologies are applied. The network node includes processing circuitry. The processing circuitry is configured to cause the network node to determine an application delay based at least in part on a first subcarrier spacing, SCS, associated with a scheduling component carrier bandwidth part, BWP, the application delay being associated with at least one of the first and second minimum scheduling offsets.

In some embodiments of this aspect, the processing circuitry is configured to determine the application delay by being configured to cause the network node to determine the application delay further based at least in part on the first minimum scheduling offset, the first minimum scheduling offset being a currently applied minimum scheduling offset. In some embodiments of this aspect, the application delay corresponds to converting between a second scheduling mode and a first scheduling mode, the first and second scheduling modes being different at least in the respective minimum scheduling offset. In some embodiments of this aspect, the second scheduling mode is a cross-slot mode in which the minimum scheduling offset is greater than zero, and the first scheduling mode is a same slot mode in which the minimum scheduling offset parameter is equal to zero.

In some embodiments of this aspect, the processing circuitry is configured to determine the application delay for cross-carrier scheduling with a mixed numerology by being configured to cause the network node to when the first SCS associated with the scheduling component carrier BWP and a second subcarrier spacing, SCS, associated with a scheduled component carrier BWP are different, determine a normalized value for the first minimum scheduling offset of the scheduled component carrier BWP relative to the first SCS associated with the scheduling component carrier BWP.

In some embodiments of this aspect, the normalized value, minK', is determined by:

$$minK' = minK \cdot \frac{2^{\mu_{PDCCH}}}{2^{\mu_{PDSCH}}}$$

wherein minK is a currently applied minimum scheduling offset;

$\mu_{PDCCH}$ is associated with the first SCS, the first SCS being associated with a scheduling physical downlink control channel, PDCCH; and $\mu_{PDSCH}$ is associated with the second SCS, the second SCS being associated with a scheduled physical downlink shared channel, PDSCH.

In some embodiments of this aspect, the processing circuitry is configured to determine the application delay by being configured to cause the network node to determine a minimum feasible application delay, Z; and when an associated physical downlink control channel, PDCCH, monitoring occasion comes after a specific symbol within a slot, increase the minimum feasible application delay by a specific amount. In some embodiments of this aspect, the specific amount is 1 slot. In some embodiments of this aspect, the processing circuitry is configured to determine the application delay by being configured to cause the network node to determine a currently applied minimum scheduling offset as the application delay based at least in part on the first SCS associated with the scheduling component carrier BWP and a second subcarrier spacing, SCS, associated with a scheduled component carrier BWP.

In some embodiments of this aspect, the processing circuitry is configured to cause the network node to transmit an indication of the determined application delay to the wireless device. In some embodiments of this aspect, the determined application delay indicates when to start applying the second minimum scheduling offset after a change indication is received by the wireless device, the change indication indicating to apply a new minimum scheduling offset.

In some embodiments of this aspect, the processing circuitry is configured to determine the application delay by being configured to cause the network node to determine the application delay based at least in part on a currently applied minimum scheduling offset in the scheduled component carrier BWP, a minimum feasible application delay, Z, of the scheduling component carrier BWP, the first SCS associated with the scheduling component carrier BWP and a second subcarrier spacing, SCS, associated with a scheduled component carrier BWP. In some embodiments of this aspect, the determined application delay is based at least in part on a type of physical downlink control channel, PDCCH, monitoring case.

According to another aspect of the present disclosure, a wireless device is provided for transitioning between a first minimum scheduling offset and a second minimum scheduling offset in which multiple numerologies are applied. The wireless device includes processing circuitry. The processing circuitry is configured to cause the wireless device to receive an indication of an application delay from a network node, the application delay being based at least in part on a first subcarrier spacing, SCS, associated with a scheduling component carrier bandwidth part, BWP, and the application delay being associated with at least one of the first and second minimum scheduling offsets; and start to apply the second minimum scheduling offset based at least in part on the received application delay.

In some embodiments of this aspect, the application delay is further based at least in part on the first minimum scheduling offset, the first minimum scheduling offset being a currently applied minimum scheduling offset. In some embodiments of this aspect, the application delay corresponds to converting between a second scheduling mode and a first scheduling mode, the first and second scheduling modes being different at least in the respective minimum scheduling offset. In some embodiments of this aspect, the second scheduling mode is a cross-slot mode in which the minimum scheduling offset is greater than zero, and the first scheduling mode is a same slot mode in which the minimum scheduling offset parameter is equal to zero.

In some embodiments of this aspect, the application delay is for cross-carrier scheduling with a mixed numerology; and when the first SCS associated with the scheduling component carrier BWP and a second subcarrier spacing, SCS, associated with a scheduled component carrier BWP are different, the application delay is further based at least in part on a normalized value for the first minimum scheduling offset of the scheduled component carrier BWP relative to the first SCS associated with the scheduling component carrier BWP.

In some embodiments of this aspect, the normalized value, minK', is determined by:

$$minK' = minK \cdot \frac{2^{\mu_{PDCCH}}}{2^{\mu_{PDSCH}}}$$

wherein minK is a currently applied minimum scheduling offset;

$\mu_{PDCCH}$ is associated with the first SCS, the first SCS being associated with a scheduling physical downlink control channel, PDCCH; and $\mu_{PDSCH}$ is associated with the second SCS, the second SCS being associated with a scheduled physical downlink shared channel, PDSCH.

In some embodiments of this aspect, the application delay is based at least in part on a minimum feasible application delay, Z; and when an associated physical downlink control channel, PDCCH, monitoring occasion comes after a specific symbol within a slot, the minimum feasible application delay is increased by a specific amount. In some embodiments of this aspect, the specific amount is 1 slot. In some embodiments of this aspect, the application delay is a currently applied minimum scheduling offset based at least in part on the first SCS associated with the scheduling component carrier BWP and a second subcarrier spacing, SCS, associated with a scheduled component carrier BWP.

In some embodiments of this aspect, the determined application delay indicates when to start applying the second minimum scheduling offset after a change indication is received by the wireless device, the change indication indicating to apply a new minimum scheduling offset. In some embodiments of this aspect, the processing circuitry is further configured to cause the network node to receive the change indication via a downlink control information, DCI, message. In some embodiments of this aspect, the application delay is based at least in part on a currently applied minimum scheduling offset in the scheduled component carrier BWP, a minimum feasible application delay, Z, of the scheduling component carrier BWP, the first SCS associated with the scheduling component carrier BWP and a second subcarrier spacing, SCS, associated with a scheduled component carrier BWP. In some embodiments of this aspect, the application delay is based at least in part on a type of physical downlink control channel, PDCCH, monitoring case.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
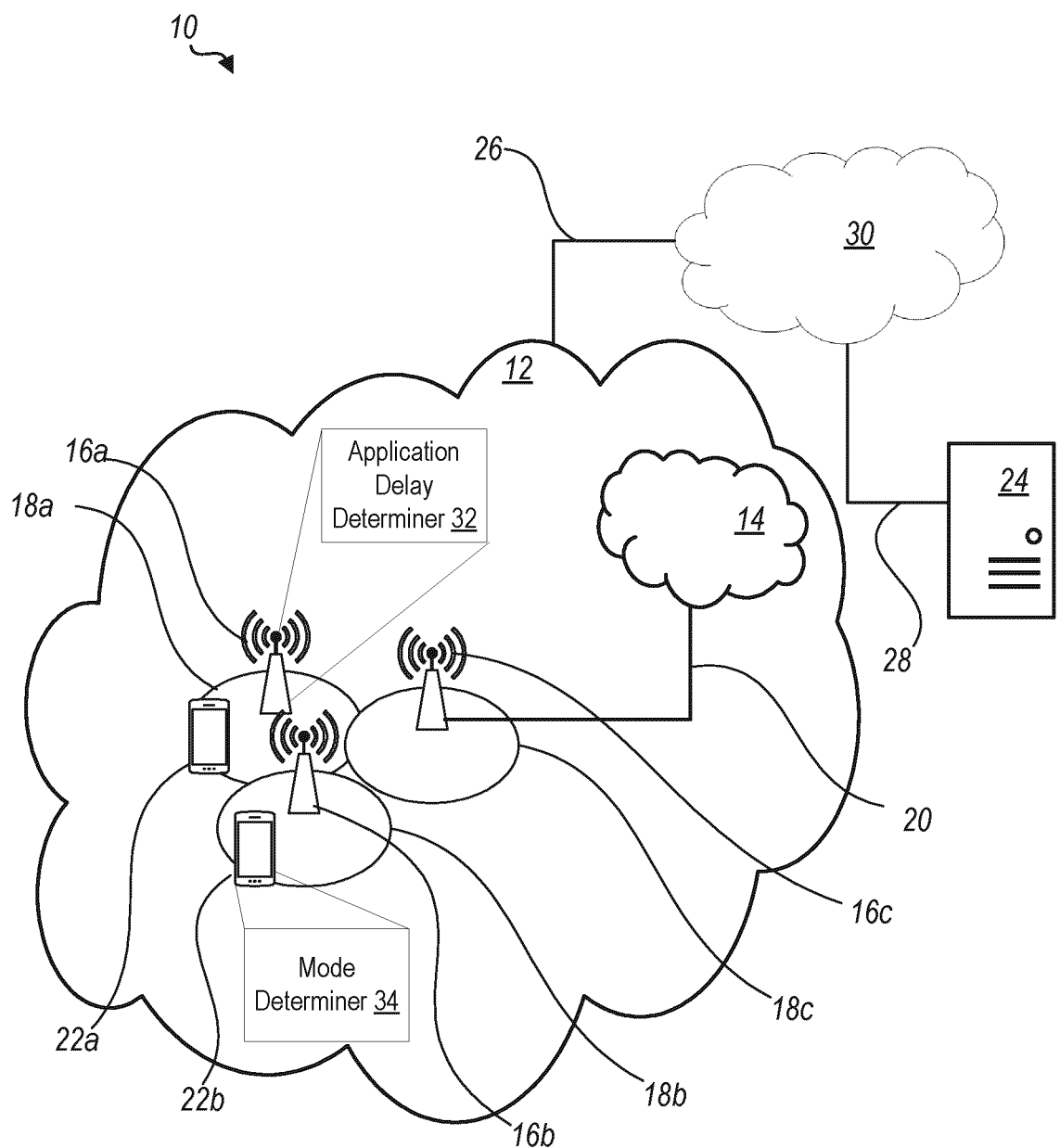
FIG. 1 is a schematic diagram of an exemplary network architecture illustrating a communication system connected via an intermediate network to a host computer according to the principles in the present disclosure.

As discussed above, while switching between cross-slot mode and same-slot mode may be beneficial, the mode used by the wireless device and the network node in a certain slot should generally be agreed upon, (i.e., no misalignment between the network node and the wireless device). Otherwise, error on the PDCCH decoding might occur. For example, the wireless device may receive a scheduling with a K0 or K2 value less than the minimumSchedulingOffset.

To achieve alignment, the wireless device and the network node may agree on when to apply a certain mode (i.e., cross-slot mode or same-slot mode) during the transmission. While the network node could apply the change on the mode directly in the next slot, the wireless device might not be able to do so. This may be because the wireless device needs time to decode the PDCCH received in the PDCCH monitoring occasion (MO). This decoding process may finish anytime between the last symbol of the received PDCCH to the first symbol of PDSCH scheduled by the PDCCH. A certain application delay, therefore, may be specified so that the network node and the wireless device are in agreement on when to start applying a certain mode (cross-slot mode or same-slot mode, i.e., a minimum scheduling offset greater than zero or a minimum scheduling offset equal to zero).

The application delay may be only specified considering a same-numerology scheduling case (i.e., same-carrier scheduling or cross-carrier scheduling with the same numerology) e.g., with PDCCH monitoring case 1-1. However, the wireless device may be configured with e.g., PDCCH monitoring case 1-2 or PDCCH monitoring case 2. In addition, or alternatively, the wireless device may be scheduled by the network node using cross-carrier scheduling with mixed numerology.

Some embodiments of the present disclosure provide for methods and arrangements to determine the application delay of a new minimumSchedulingOffset (e.g., a change/switch between a first minimum scheduling offset value to a second minimum scheduling offset value). Some embodiments may accommodate cross-carrier scheduling and/or PDCCH monitoring case 1-2 and case 2. In cross-carrier scheduling, a scheduling PDCCH in a certain slot may schedule a PxSCH (i.e., PUSCH, PDSCH) in a different slot.

Different aspects related to determining the application delay of e.g., cross-slot to same-slot scheduling and vice versa for a wireless device which is configured with minimumSchedulingOffset are disclosed. Particularly, several mechanisms are disclosed to determine the application delay considering the following examples:

Cross-carrier or same-carrier scheduling;
Possibility of the plurality of PDCCH monitoring cases, i.e., where the PDCCH MOs fall within one slot;
Possibility of having a plurality of SCSs between the scheduling PDCCH and scheduled PxSCH (i.e., PUSCH, PDSCH); and
Minimum feasible application delay, i.e., the minimum time required by or allotted to the wireless device to switch between cross-slot scheduling and same-slot scheduling, or alternatively to switch between two different minimumSchedulingOffset values (e.g., a first and a second minimum scheduling offset values).

Before describing in detail exemplary embodiments, it is noted that the embodiments reside primarily in combinations of apparatus components and processing steps related to determining minimum scheduling offset application delay. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide methods for determining minimum scheduling offset application delay. In some embodiments, the application delay of the minimumSchedulingOffset can be determined, including for the PDCCH monitoring case 2 or PDCCH monitoring case 1-2; and for the case of cross-carrier scheduling with mixed numerologies. Having this, the wireless device and the network node could have agreement on when to start a certain mode (i.e., cross-slot mode or same-slot mode) or alternatively, to start the new minimumSchedulingOffset value for those cases and thus, avoid misalignment.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16a. A second wireless device 22b in coverage area 18b is wirelessly connectable to the corresponding network node 16*b*. While a plurality of wireless devices 22*a*, 22*b* (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected wireless devices 22*a*, 22*b* and the host computer 24. The connectivity may be described as an over-the-top (OTT) connection. The host computer 24 and the connected wireless devices 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22*a*. Similarly, the network node 16 need not be aware of the future routing of an outgoing uplink communication originating from the wireless device 22*a* towards the host computer 24.

A network node 16 is configured to include an application delay determiner 32 which is configured to determine an application delay based at least in part on a first subcarrier spacing, SCS, associated with a scheduling component carrier bandwidth part, BWP, the application delay being associated with at least one of the first and second minimum scheduling offsets. In some embodiments, network node 16 is configured to include an application delay determiner 32 which is configured to determine an application delay corresponding to converting between a cross slot mode in which a minimum scheduling offset parameter is greater than zero and a same slot mode in which the minimum scheduling offset parameter is equal to zero.

A wireless device 22 is configured to include a mode determiner unit 34 which is configured to receive an indication of an application delay from a network node, the application delay being based at least in part on a first subcarrier spacing, SCS, associated with a scheduling component carrier bandwidth part, BWP, and the application delay being associated with at least one of the first and second minimum scheduling offsets; and start to apply the second minimum scheduling offset based at least in part on the received application delay. In some embodiments, a wireless device 22 is configured to include a mode determiner unit 34 which is configured to start a same slot mode or a cross slot mode according to whether the application delay is zero or greater than zero.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include application delay determiner 32 which is configured to determine an application delay corresponding to converting between a cross slot mode in which a minimum scheduling offset parameter is greater than zero and a same slot mode in which the minimum scheduling offset parameter is equal to zero.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include mode determiner unit 34 which is configured to start a same slot mode or a cross slot mode according to whether the application delay is zero or greater than zero.

Figure 2:
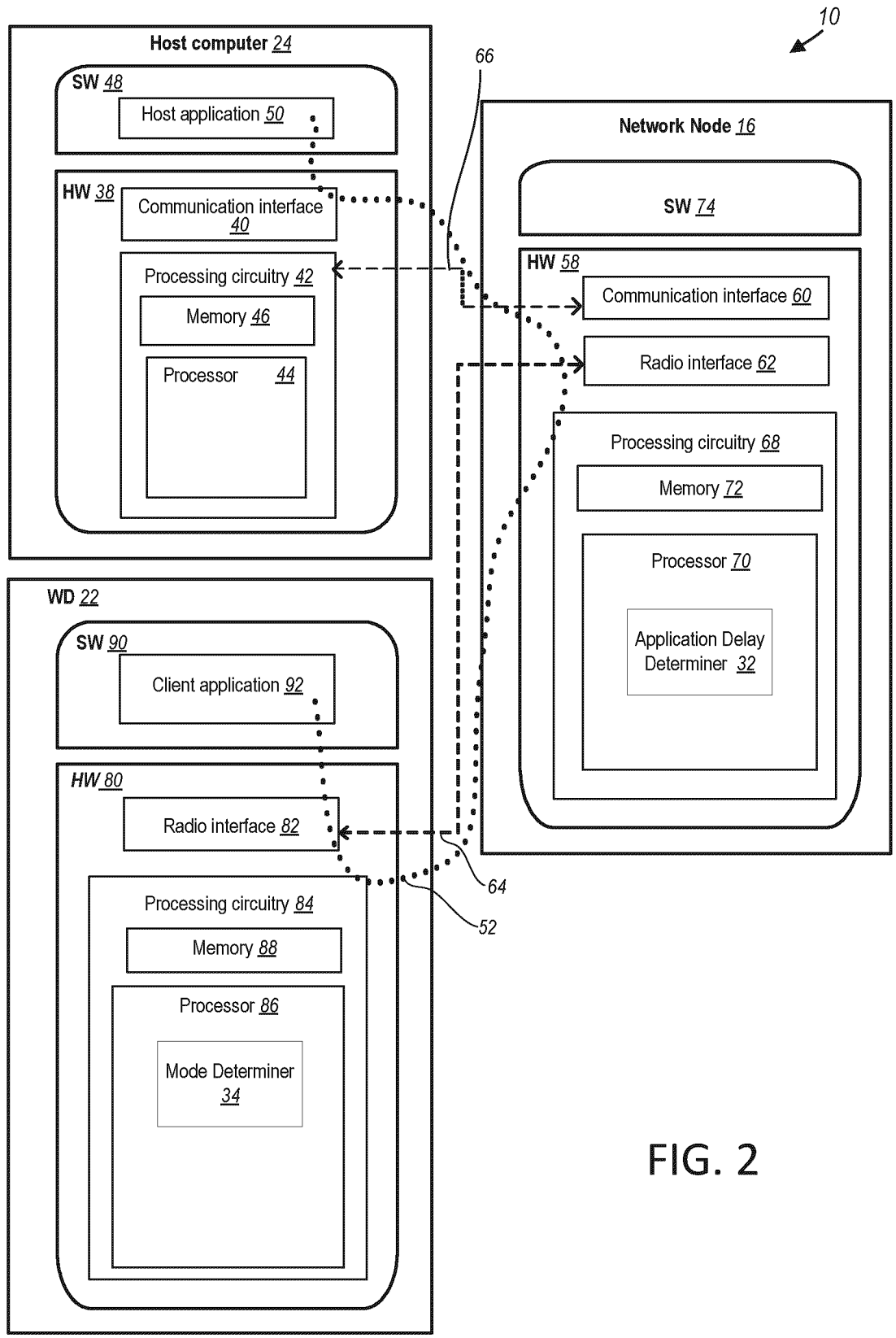
FIG. 2 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as application delay determiner 32, and mode determiner 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a wireless device 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

Figures 5, 6:
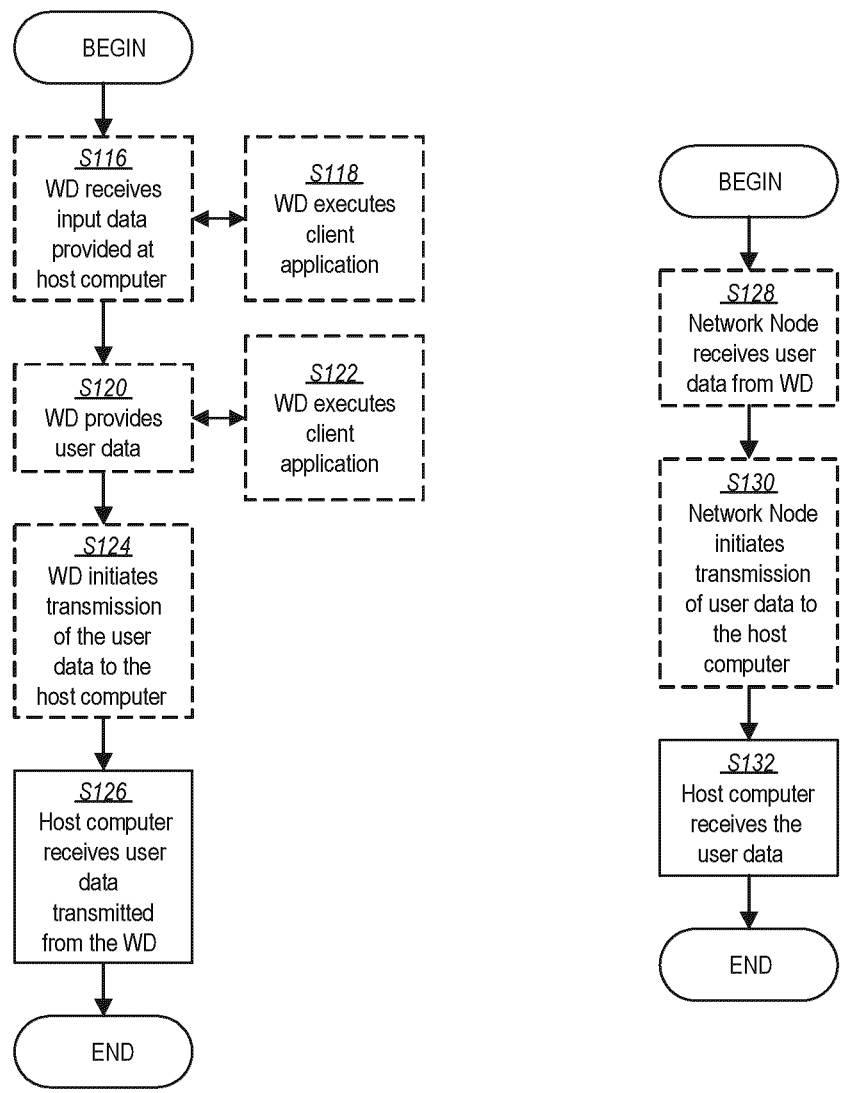
FIG. 5 is a flowchart illustrating exemplary methods implemented in a communication system including a host computer, a network node and a wireless device for receiving user data from the wireless device at a host computer according to some embodiments of the present disclosure.
FIG. 6 is a flowchart illustrating exemplary methods implemented in a communication system including a host computer, a network node and a wireless device for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
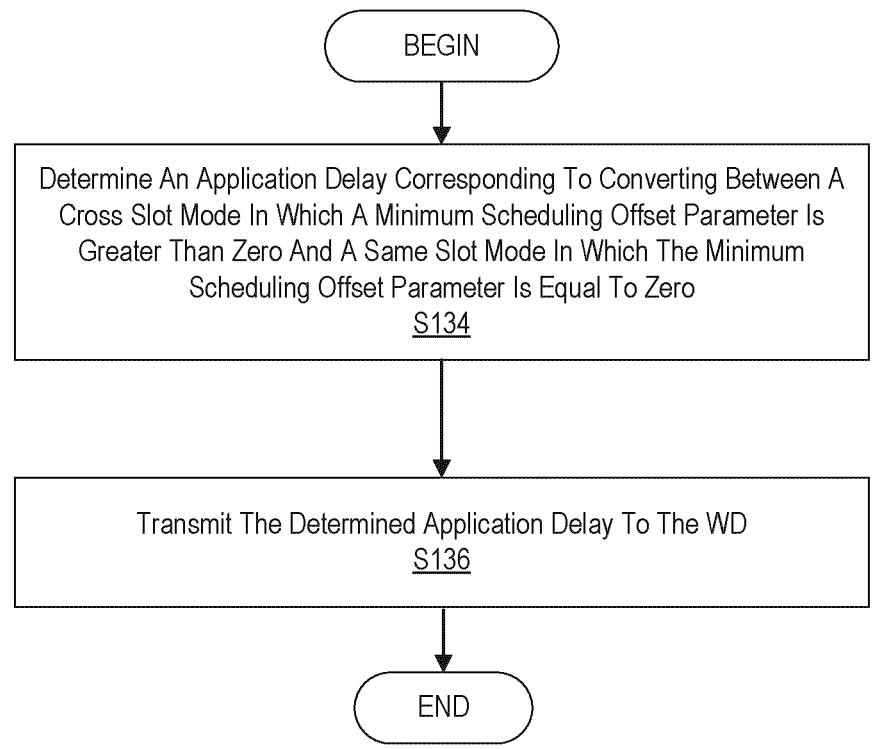
FIG. 7 is a flowchart of an exemplary process in a network node for methods for determining minimum scheduling offset application delay according to some embodiments of the present disclosure.

FIG. 7 is a flowchart of an exemplary process in a network node 16 for methods for determining minimum scheduling offset application delay. One or more blocks described herein may be performed by one or more elements of network node 16 such as by one or more of processing circuitry 68 (including the application delay determiner 32), processor 70, radio interface 62 and/or communication interface 60. Network node 16 such as via processing circuitry 68 and/or processor 70 and/or radio interface 62 and/or communication interface 60 is configured to determine an application delay corresponding to converting between a cross slot mode in which a minimum scheduling offset parameter is greater than zero and a same slot mode in which the minimum scheduling offset parameter is equal to zero (Block S134). The process also optionally includes transmitting the determined application delay to the wireless device (Block S136).

Figure 8:
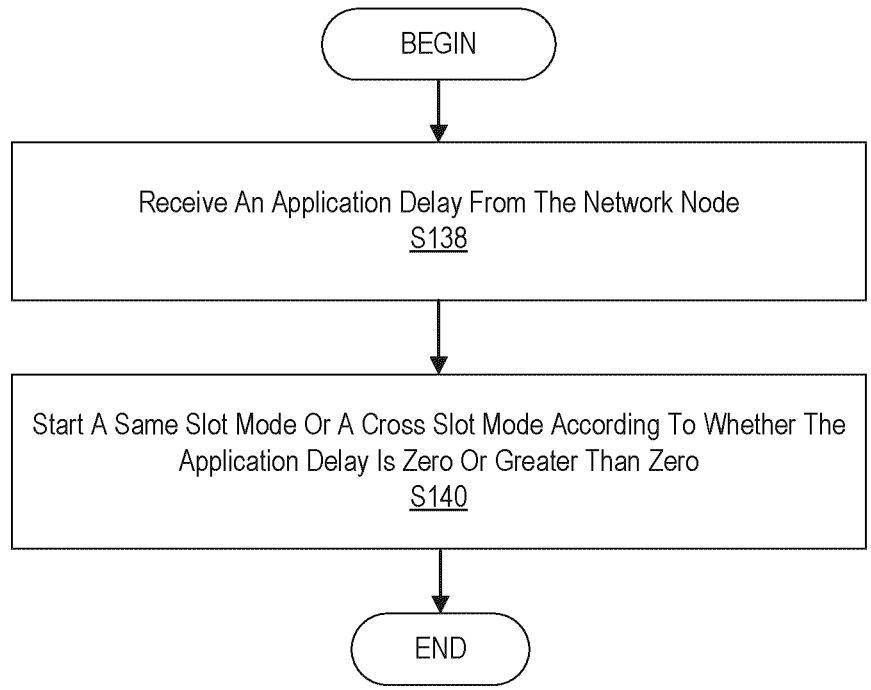
FIG. 8 is a flowchart of an exemplary process in a wireless device for methods for determining minimum scheduling offset application delay.

FIG. 8 is a flowchart of an exemplary process in a wireless device 22 according to some embodiments of the present disclosure. One or more blocks described herein may be performed by one or more elements of wireless device 22 such as by one or more of processing circuitry 84 (including the mode determiner unit 34), processor 86, radio interface 82 and/or communication interface 60. Wireless device 22 such as via processing circuitry 84 and/or processor 86 and/or radio interface 82 is configured to receive an application delay from the network node (Block S138). The process also includes starting a same slot mode or a cross slot mode according to whether the application delay is zero or greater than zero (Block S140).

Figure 9:
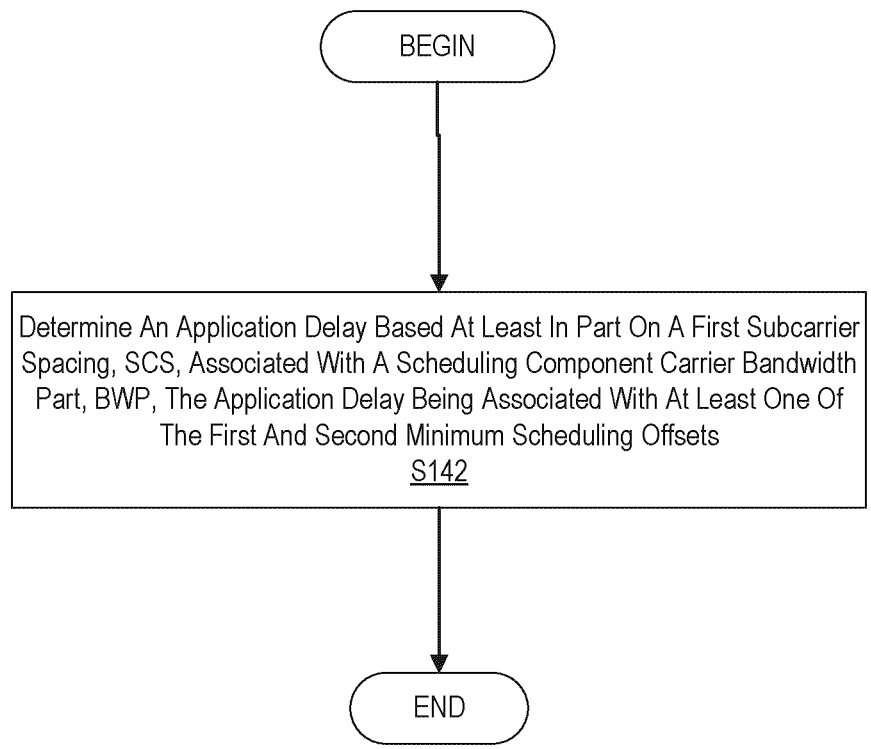
FIG. 9 is a flowchart of an exemplary process in a network node for methods for determining minimum scheduling offset application delay according to some embodiments of the present disclosure.

FIG. 9 is a flowchart of an exemplary process in a network node 16 for transitioning between a first minimum scheduling offset and a second minimum scheduling offset in which multiple numerologies are applied. One or more blocks described herein may be performed by one or more elements of network node 16 such as by one or more of processing circuitry 68 (including the application delay determiner 32), processor 70, radio interface 62 and/or communication interface 60. Network node 16 such as via processing circuitry 68 and/or processor 70 and/or radio interface 62 and/or communication interface 60 is configured to determine (Block S142) an application delay based at least in part on a first subcarrier spacing, SCS, associated with a scheduling component carrier bandwidth part, BWP, the application delay being associated with at least one of the first and second minimum scheduling offsets.

In some embodiments, network node 16 such as via processing circuitry 68 and/or processor 70 and/or radio interface 62 and/or communication interface 60 is configured to determine the application delay by being configured to cause the network node to determine the application delay further based at least in part on the first minimum scheduling offset, the first minimum scheduling offset being a currently applied minimum scheduling offset. In some embodiments, the application delay corresponds to converting between a second scheduling mode and a first scheduling mode, the first and second scheduling modes being different at least in the respective minimum scheduling offset. In some embodiments, the second scheduling mode is a cross-slot mode in which the minimum scheduling offset is greater than zero, and the first scheduling mode is a same slot mode in which the minimum scheduling offset parameter is equal to zero.

In some embodiments, network node 16 such as via processing circuitry 68 and/or processor 70 and/or radio interface 62 and/or communication interface 60 is configured to determine the application delay for cross-carrier scheduling with a mixed numerology by being configured to cause the network node to when the first SCS associated with the scheduling component carrier BWP and a second subcarrier spacing, SCS, associated with a scheduled component carrier BWP are different, determine a normalized value for the first minimum scheduling offset of the scheduled component carrier BWP relative to the first SCS associated with the scheduling component carrier BWP.

In some embodiments, the normalized value, minK', is determined by:

$$\mathrm{min}K' = \mathrm{min}K \cdot \frac{2^{\mu_{PDCCH}}}{2^{\mu_{PDSCH}}}$$

wherein minK is a currently applied minimum scheduling offset;

$\mu_{PDCCH}$ is associated with the first SCS, the first SCS being associated with a scheduling physical downlink control channel, PDCCH; and $\mu_{PDSCH}$ is associated with the second SCS, the second SCS being associated with a scheduled physical downlink shared channel, PDSCH.

In some embodiments, network node 16 such as via processing circuitry 68 and/or processor 70 and/or radio interface 62 and/or communication interface 60 is configured to determine the application delay by being configured to cause the network node to determine a minimum feasible application delay, Z; and when an associated physical downlink control channel, PDCCH, monitoring occasion comes after a specific symbol within a slot, increase the first minimum scheduling offset by a specific amount. In some embodiments, the specific amount is 1 slot.

In some embodiments, network node 16 such as via processing circuitry 68 and/or processor 70 and/or radio interface 62 and/or communication interface 60 is configured to determine the application delay by being configured to cause the network node 16 to determine a currently applied minimum scheduling offset as the application delay based at least in part on the first SCS associated with the scheduling component carrier BWP and a second subcarrier spacing, SCS, associated with a scheduled component carrier BWP. In some embodiments, network node 16 such as via processing circuitry 68 and/or processor 70 and/or radio interface 62 and/or communication interface 60 is configured to transmit an indication of the determined application delay to the wireless device 22.

In some embodiments, the determined application delay indicates when to start applying the second minimum scheduling offset after a change indication is received by the wireless device, the change indication indicating to apply a new minimum scheduling offset. In some embodiments, network node 16 such as via processing circuitry 68 and/or processor 70 and/or radio interface 62 and/or communication interface 60 is configured to determine the application delay by being configured to cause the network node to determine the application delay based at least in part on a currently applied minimum scheduling offset in the scheduled component carrier BWP, an application delay, Z, of the scheduling component carrier BWP, the first SCS associated with the scheduling component carrier BWP and a second subcarrier spacing, SCS, associated with a scheduled component carrier BWP. In some embodiments, the determined application delay is based at least in part on a type of physical downlink control channel, PDCCH, monitoring case.

Figure 10:
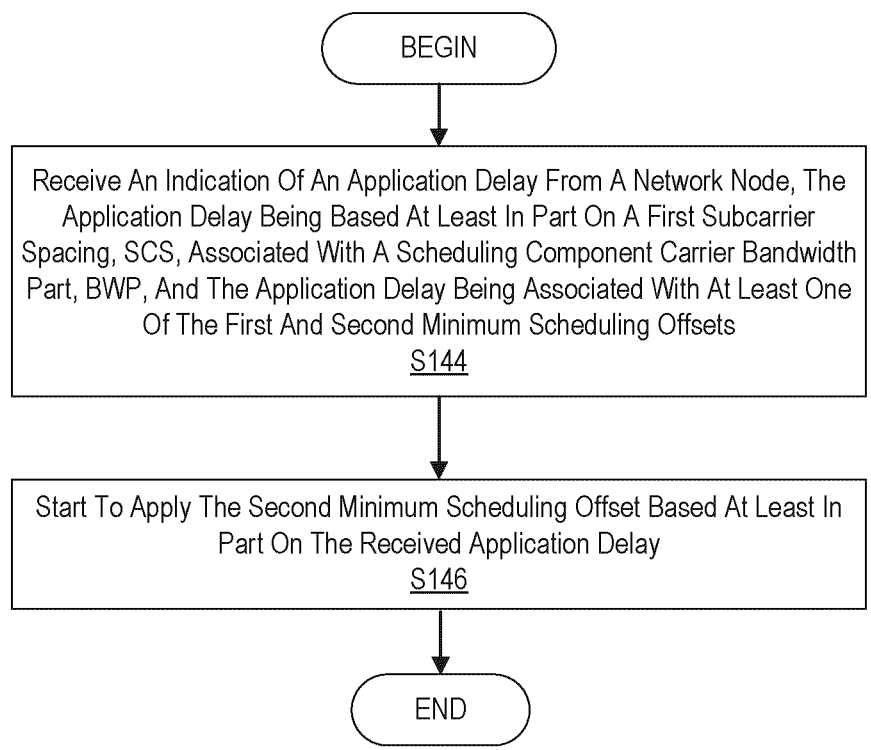
FIG. 10 is a flowchart of an exemplary process in a wireless device for methods for determining minimum scheduling offset application delay.

FIG. 10 is a flowchart of an exemplary process in a wireless device 22 according to some embodiments of the present disclosure such as for transitioning between a first minimum scheduling offset and a second minimum scheduling offset in which multiple numerologies are applied. One or more blocks described herein may be performed by one or more elements of wireless device 22 such as by one or more of processing circuitry 84 (including the mode determiner unit 34), processor 86, radio interface 82 and/or communication interface 60. Wireless device 22 such as via processing circuitry 84 and/or processor 86 and/or radio interface 82 is configured to receive (Block S144) an indication of an application delay from a network node, the application delay being based at least in part on a first subcarrier spacing, SCS, associated with a scheduling component carrier bandwidth part, BWP, and the application delay being associated with at least one of the first and second minimum scheduling offsets. Wireless device 22 such as via processing circuitry 84 and/or processor 86 and/or radio interface 82 is configured to start (Block S146) to apply the second minimum scheduling offset based at least in part on the received application delay.

In some embodiments, the application delay is further based at least in part on the first minimum scheduling offset, the first minimum scheduling offset being a currently applied minimum scheduling offset. In some embodiments, the application delay corresponds to converting between a second scheduling mode and a first scheduling mode, the first and second scheduling modes being different at least in the respective minimum scheduling offset. In some embodiments, the second scheduling mode is a cross-slot mode in which the minimum scheduling offset is greater than zero, and the first scheduling mode is a same slot mode in which the minimum scheduling offset parameter is equal to zero.

In some embodiments, the application delay is for cross-carrier scheduling with a mixed numerology; and when the first SCS associated with the scheduling component carrier BWP and a second subcarrier spacing, SCS, associated with a scheduled component carrier BWP are different, the application delay is further based at least in part on a normalized value for the first minimum scheduling offset of the scheduled component carrier BWP relative to the first SCS associated with the scheduling component carrier BWP.

In some embodiments, the normalized value, minK', is determined by:

$$minK' = minK \cdot \frac{2^{\mu_{PDCCH}}}{2^{\mu_{PDSCH}}}$$

wherein minK is a currently applied minimum scheduling offset;
$\mu_{PDCCH}$ is associated with the first SCS, the first SCS being associated with a scheduling physical downlink control channel, PDCCH; and
$\mu_{PDSCH}$ is associated with the second SCS, the second SCS being associated with a scheduled physical downlink shared channel, PDSCH.

In some embodiments, the application delay is based at least in part on a minimum feasible application delay, Z; and when an associated physical downlink control channel, PDCCH, monitoring occasion comes after a specific symbol within a slot, the first minimum scheduling offset is increased by a specific amount. In some embodiments, the specific amount is 1 slot. In some embodiments, the application delay is a currently applied minimum scheduling offset based at least in part on the first SCS associated with the scheduling component carrier BWP and a second subcarrier spacing, SCS, associated with a scheduled component carrier BWP.

In some embodiments, the determined application delay indicates when to start applying the second minimum scheduling offset after a change indication is received by the wireless device, the change indication indicating to apply a new minimum scheduling offset. In some embodiments, wireless device 22 such as via processing circuitry 84 and/or processor 86 and/or radio interface 82 is configured to receive the change indication via a downlink control information, DCI, message. In some embodiments, the application delay is based at least in part on a currently applied minimum scheduling offset in the scheduled component carrier BWP, an application delay, Z, of the scheduling component carrier BWP, the first SCS associated with the scheduling component carrier BWP and a second subcarrier spacing, SCS, associated with a scheduled component carrier BWP. In some embodiments, the application delay is based at least in part on a type of physical downlink control channel, PDCCH, monitoring case.

Having described the general process flow of arrangements of the disclosure and having provided examples of hardware and software arrangements for implementing the processes and functions of the disclosure, the sections below provide details and examples of arrangements and methods for determining minimum scheduling offset application delay, which may be implemented by network node 16 and/or wireless device 22.

A scenario is considered when the network node 16 and the wireless device 22 currently apply a certain minimum-SchedulingOffset1 value and want to transit to another minimumSchedulingOffset2 value, (e.g., after receiving an indication to change the mode from the network node 16). Here, the currently applied minimumSchedulingOffset will be denoted as minK. Below, aspects are disclosed that relate to the determination of the application delay of the transition between modes (CS-mode and SS-mode), or alternatively, transition from applying the currently applied minK to applying the new minK value.

In determining the application delay, one or more of several aspects may be considered by network node 16 and/or wireless device 22:

1) The minimumSchedulingOffset value prior to the change, minK.

In some embodiments, minK value represents the minimum slot distance between the scheduling PDCCH and scheduled PDSCH. In one example, the minK value might represent the maximum number of slots used by the wireless device 22 to finish the PDCCH reception and decoding, or PDCCH processing time. The minK can further be determined based on the specific cell, BWP, or SCS.

Yet in another example, the wireless device 22 may provide assistance information helping the network node 16 configure the minK for different scenarios, e.g., if and how minK should be configured for different BWPs or different SCSs.

Additionally, the minK may be determined based on a trade-off of power-saving gain and wireless device 22 throughput. For example, if the wireless device 22 can process PDCCH within a slot, and e.g., PDCCH monitoring case 1-1 is used, a minK of 1 slot may provide a good power-saving gain and the minimum wireless device 22 throughput loss.

In another example, if e.g., the value of minK is not less than a minimum feasible application delay, and/or e.g., PDCCH monitoring case 1-1 is used, and/or e.g., same-numerology scheduling is applied, the new minK application delay may be equal to the minK (i.e., currently applied) value. However, if e.g., other PDCCH monitoring cases are used, the configured minK may be increased by e.g., network node 16 and/or wireless device 22. For example, when e.g., PDCCH monitoring case 1-2 or 2 is used and/or the PDCCH monitoring occasion (MO) falls after a specific symbol, the network node 16 may increase the minK by one slot and so on.

2) Minimum feasible application delay, Z.

In one example, the value of Z represents the minimum time required by and/or allotted to the wireless device 22 to receive and decode PDCCH. The value of Z can, for example, be determined on a slot basis. The value of Z can be further determined by assuming a certain PDCCH monitoring case (e.g. PDCCH monitoring case 1-1). Additionally, or alternatively, the value of Z may depend on the numerology (or subcarrier spacing (SCS)) used by the scheduling component carrier's (CC's) BWP. For example, scheduling the CC's BWP with small SCS (e.g., 15 and 30 kHz) and PDCCH monitoring case 1-1 might have Z=1 while scheduling the CC's BWP with larger SCSs (e.g., 60 and 120 kHz) might have Z=2, etc.

The value of Z may be useful as a wireless device 22 could currently apply a minK value which is smaller than Z. For example, when the same-slot mode is currently running, the minK value is disabled or is set to 0. In that case, the wireless device 22 may not apply the new minK value at the minK-th slot after a minK value change indication is received. Rather, the wireless device 22 may only apply the new minK value in the Z-th slot after the minK value change indication is received.

3) The SCS of the scheduling CC's BWP and the SCS of the scheduled CC's BWP.

In one example, if the BWP's SCS of both CCs are the same, the network node 16 may consider the currently applied minK as the application delay, particularly if e.g., PDCCH monitoring case 1-1 is used. However, for power saving or for reducing the chance of misalignment or any other reason, the network node 16 may consider a larger application delay.

In another example, if e.g., cross-carrier scheduling with mixed numerology is used, in which case the SCS of the scheduling CC's BWP and the scheduled CC's BWP are different, the network node 16 may use a normalized value of minK of the scheduled CC's BWP relative to the SCS of the scheduling CC's BWP. For example, the following normalization can be used:

$$\mathrm{min}K' = \mathrm{min}K \cdot \frac{2^{\mu_{PDCCH}}}{2^{\mu_{PDSCH}}}$$

The network node 16 can further apply an additional weighting factor for other reasons, e.g., to provide more power saving opportunity to the wireless device 22, reduce the chance of misalignment and so on.

4) PDCCH monitoring case.

In some configurations, it may be possible that the network node 16 configures the wireless device 22 with PDCCH monitoring case 1-2 or case 2, or any other PDCCH monitoring where the PDCCH MO can be expected to be anywhere in the slot. On the other hand, the network node 16 may configure the wireless device 22 with the minK value and agree with the wireless device 22 for the Z value by assuming PDCCH monitoring case 1-1 as the typical PDCCH monitoring case. Thus, the network node 16 and the wireless device 22 may also be aware of what kind of PDCCH monitoring case is used in the transmission.

In one example, if e.g., PDCCH monitoring case 1-2 is employed and/or, the associated PDCCH MO comes after a specific symbol within the slot, the network node 16 may decide to increase the minimumSchedulingOffset by a specific amount, e.g., 1 additional slot.

Similarly, if e.g., PDCCH monitoring case 2 is employed, and/or, the last PDCCH MO in a slot comes after a specific symbol within the slot, the network node 16 may determine to increase the minimumSchedulingOffset by a specific amount, e.g., 1 additional slot.

Considering any one or more of the above factors, some or all of the following methods may be used to determine the new minK application delay.

In one example, a method can be used to determine the new minK application delay when the same-carrier scheduling is used and/or a PDCCH monitoring case that is different from the reference PDCCH monitoring case is applied. The method may include one or more of:

Storing the current minK value wherein the current minK value is associated with the current BWP and/or for a reference PDCCH monitoring case (e.g., PDCCH monitoring case 1-1);

Storing the Z value wherein the value is associated with the BWP's SCS and/or for a reference PDCCH monitoring case (e.g., PDCCH monitoring case 1-1);

Calculating the new-minK application delay for the second PDCCH monitoring case (e.g., PDCCH monitoring case 1-2);

Wherein the derived value is based on at least one or more of:
a) Current minK value;
b) The applied Z value;
c) An additional factor (e.g., a) that is dependent on the PDCCH monitoring case and the last symbol of a reference PDCCH monitoring case. The value of a can further be based on the end symbol of the second PDCCH monitoring case; and/or
d) As another option, the value of a can also be based on a standardized processing time required by the scheduling CC to schedule a CC with higher SCS. In this option, the value of a depends, at least, on the scheduling SCS and PDCCH monitoring case.

Appling the application delay. For example, the network node 16 schedules the wireless device 22 with K0, K2, etc., values not smaller than new minK value after the application delay. The wireless device 22 may be ready for scheduling that use K0, K2, etc. values not larger than minK value. Note that as the minK value is per-BWP, the minK value for downlink (DL) and uplink (UL) might be different (i.e., limits the K0 and K2 value differently).

In another example, a method described below may be used to determine the new minK application delay when cross-carrier scheduling is used (in particular, for the case of mixed numerology) and/or a PDCCH monitoring case that is the same with the reference PDCCH monitoring case is applied. This method may include one or more of the following:

Storing the current minK value, wherein the current minK value is associated with the current scheduled CC's BWP and/or for a reference PDCCH monitoring case (e.g. PDCCH monitoring case 1-1).

Storing the Z value wherein the value is associated with the SCS of the scheduling CC'S BWP and/or for a reference PDCCH monitoring case (e.g., PDCCH monitoring case 1-1).

Calculating the new-minK application delay for the scheduling CC.

Wherein the derived value is based on at least one or more of:
a) Current minK value;
b) The applied Z value;
c) The numerology (or SCS) of the scheduling CC's BWP; and/or
d) The numerology (or SCS) of the scheduled CC's BWP.

Appling the application delay. For example, at the network node 16, the network node 16 schedules the wireless device 22 with K0, K2, etc., values not smaller than new minK value after the application delay. The wireless device 22 may be ready for scheduling that uses K0, K2, etc., values not larger than the minK value. Note that as the minK value is per-BWP, the minK value for DL and UL might be different (i.e., limits the K0 and K2 value differently).

In yet another example, combinations of the above methods can be used to determine the new-minK application delay when cross-carrier scheduling is used and/or PDCCH monitoring that is different from the reference PDCCH monitoring case is applied. In one example, this can be done by inserting the third and fourth items of the first method example as a factor in the fourth item of the second method example.

As an example, using the above-described methods, the following formula may be used to determine the new-minK application delay of a scheduling CC having numerology $\mu\_CC1$ in its BWP, which schedules a CC having numerology $\mu\_CC2$ in its BWP configuration. Note that the following formula and steps are only one example. A derivation, modification, etc. based on the above methods is not precluded.

$$X = \max\left(\left\lceil \min K \cdot \frac{2^{\mu_{CC_1}}}{2^{\mu_{CC_2}}} \right\rceil, Z + \alpha\right).$$

Specifically, e above formula may be explained as:
Storing the minK value configured in the scheduled CC's BWP;
Storing the applied Z value of the scheduling CC's BWP; and
Determine the value of parameter a.

In one example, the value of a can be based on standardized processing time required by the scheduling CC to schedule CC with higher SCS. In this option, the value of a depends, at least, on the scheduling SCS and PDCCH monitoring case.

In another example, the network node 16 may determine to minimize the wireless device 22 throughput loss and as such consider this value to be zero. In another example, the network node 16 may determine to consider a higher number e.g., to provide a higher power savings opportunity to the wireless device 22 or reduce the chance of misalignment and so on.

In another example, when PDCCH monitoring case 1-2 or case 2 is used in the transmission, the value of a can be further derived from the location of the last symbol of PDCCH monitoring relative to the $3^{rd}$ symbol as the last possible symbol of PDCCH reception monitored in PDCCH monitoring case 1-1.

In yet another example, the value of a can be set to either 0 or 1. The determination of the whether to use 0 or 1 is based on the PDCCH monitoring case that is used in the scheduling CC. For example:
1) If PDCCH monitoring case 1-1 is used the value of a can be set to 0.
2) If PDCCH monitoring case 2 is used, the value of a can be set to 1.
3) If PDCCH monitoring case 1-2 is used, the network node 16 can further check in which symbols in a slot the PDCCH monitoring will end. The wireless device 22 then could determine the value of a based on this information and the numerology of the scheduling CC. For example:
a) For a scheduling CC with numerology 0 and 1 (SCS=15 kHz and 30 kHz) the value of a can be set to 0 if the PDCCH monitoring ends at $10^{th}$ symbol or smaller. Otherwise, set the value of α to 1.
b) For a scheduling CC with numerology 2 (SCS=60 kHz) the value of a can be set to 0 if the PDCCH monitoring ends at $7^{th}$ symbol or smaller. Otherwise, set the value of α to 1.
c) For a scheduling CC with numerology 3 (SCS=120 kHz) the value of a can be set to 0 if the PDCCH monitoring ends at $11^{th}$ symbol or smaller. Otherwise, set the value of α to 1.

It is noted that the value obtained from step 3 can be normalized and quantized to the numerology of the scheduling CC's BWP.

4. Add parameter a to the Z value.
5. Check whether the value obtained in step 4 is smaller than the value obtained in step 5. If the value obtained in step 4 is larger, the value obtained in step 4 is used as the new minK application delay. Otherwise, the value obtained in step 5 is used as the application delay.

Additional Aspects:

In the example embodiments above, a scenario was considered where the network node 16 configures the associated parameters, particularly the application delay, for an individual wireless device 22. The network node 16 may further consider adjusting the application delay or other parameters such as minK after considering all the underlying wireless devices 22 in a cell, BWP, and so on. As such, the network node 16 may wish to align these parameters among the wireless devices 22 or a subset of them. The network node 16 may also decide to choose different values for different wireless devices 22 to obtain scheduling flexibilities. Alternatively, if a specific paradigm such as multiple user multiple input multiple output (MU-MIMO) is to be used where different wireless devices 22 may be served by the network node 16 at the same time, the network node 16 may need to align associated parameters to avoid possible misalignments between different wireless devices 22.

The wireless device 22 may be expected to move from cross slot to the same slot mode after an application delay has elapsed. Depending on the other underlying conditions, the wireless device 22 may decide about choosing an appropriate power saving mode. For example, if cross-carrier scheduling is employed, and the wireless device 22 does not need to buffer the PDSCH at least of minK, the wireless device 22 may obtain a higher power saving opportunity if the application delay is larger than the minK. Hence, wireless device 22 may be able to adapt its power saving strategy accordingly and consider turning off additional modules with respect to the ones decided based on minK to obtain a higher level of saving.

In some embodiments, the network node 16 may increase the new-minK application delay to avoid misalignment, in particular for the case of transiting from a larger minK value to smaller minK value (or alternatively, transiting from CS-mode, where the minK is enabled, to same-slot mode, where the minK is disabled). The additional delay can be, for example, cX, where c is an integer and X is the application delay obtained through any of the above-described methods. The decision of whether the additional delay is implemented or not can be, for example, based on the channel quality. For example, if the channel quality is below a certain threshold, the additional delay is implemented. Conversely, when the channel quality is higher than a certain threshold, the additional delay is not implemented.

In the above-described methods, the new-minK application delay is calculated in the numerology of the scheduling CC's BWP. In another option, it is also possible to calculate the new-minK value application delay in the numerology of the scheduled CC's BWP. This may be done by multiplying the application delay obtained from the above methods with the ratio between the numerology of the scheduled CC's BWP and the numerology of the scheduling CC's BWP.

In the above-described methods, it may be assumed that the network node 16 and the wireless device 22 agree on the Z value under a reference PDCCH monitoring case (e.g. PDCCH monitoring case 1-1). If the wireless device 22 and the network node 16 are able to mutually understand that the other PDCCH monitoring case will be used throughout the transmission, the wireless device 22 and the network node 16 may agree on the Z value (which can be different from the Z value when PDCCH monitoring case 1-1 is used) in advance. In this case, the parameter a can be omitted from the above methods and/or the formula.

According to one aspect, some embodiments include a method to determine a new minK application delay which includes factors such as one or more of:

minimumSchedulingOffset configured for the scheduled CC's BWP;

the numerology of the scheduling CC's BWP and the scheduled CC's BWP;

additional factor related to the PDCCH monitoring case; and/or minimum feasible application delay.

According to one aspect, a network node 16 is configured to communicate with a wireless device 22. The network node 16 includes a radio interface 62 and/or processing circuitry 68 configured to determine an application delay corresponding to converting between a cross slot mode in which a minimum scheduling offset parameter is greater than zero and a same slot mode in which the minimum scheduling offset parameter is equal to zero, and optionally transmit the determined application delay to the wireless device 22.

According to this aspect, in some embodiments, the determined application delay is based at least in part on a type of physical downlink control channel (PDCCH) monitoring case. In some embodiments, the transmitting further includes transmitting when to start the one of the cross slot mode or the same slot mode.

According to another aspect, a method implemented in a network node 16 includes determining, via the application delay determiner 32, an application delay corresponding to converting between a cross slot mode in which a minimum scheduling offset parameter is greater than zero and a same slot mode in which the minimum scheduling offset parameter is equal to zero, and optionally transmitting the determined application delay to the wireless device 22.

According to this aspect, in some embodiments, the determined application delay is based at least in part on a type of physical downlink control channel (PDCCH) monitoring case. In some embodiments, the transmitting further includes transmitting when to start the one of the cross slot mode or the same slot mode.

According to yet another aspect, a wireless device (wireless device 22) is configured to communicate with a network node 16. The wireless device 22 includes a radio interface 82 and/or processing circuitry 84 configured to receive an application delay from the network node 16 and start a same slot mode or a cross slot mode according to whether the application delay is zero or greater than zero. According to this aspect, the wireless device 22, radio interface and processing circuitry are further configured to receive an indication of when to start the same slot mode or cross slot mode.

According to another aspect, a method implemented in a wireless device (wireless device 22) includes receiving, via the radio interface 82, an application delay from the network node 16 and starting, via the processing circuitry 84, a same slot mode or a cross slot mode according to whether the application delay is zero or greater than zero. According to this aspect, in some embodiments, the method further includes receiving an indication of when to start the same slot mode or cross slot mode.

Some embodiments may include one or more of the following:

Example A1. A network node configured to communicate with a wireless device, the network node configured to, and/or comprising a radio interface and/or comprising processing circuitry configured to:
  determine an application delay corresponding to converting between a cross slot mode in which a minimum scheduling offset parameter is greater than zero and a same slot mode in which the minimum scheduling offset parameter is equal to zero; and
  optionally transmit the determined application delay to the wireless device.

Example A2. The network node of Example A1, wherein the determined application delay is based at least in part on a type of physical downlink control channel (PDCCH) monitoring case.

Example A3. The network node of Example A1, wherein the transmitting further includes transmitting when to start the one of the cross slot mode or the same slot mode.

Example B1. A method implemented in a network node, the method comprising:
  determining an application delay corresponding to converting between a cross slot mode in which a minimum scheduling offset parameter is greater than zero and a same slot mode in which the minimum scheduling offset parameter is equal to zero; and
  optionally transmitting the determined application delay to the wireless device.

Example B2. The method of Example B1, wherein the determined application delay is based at least in part on a type of physical downlink control channel (PDCCH) monitoring case.

Example B3. The method of Example B1, wherein the transmitting further includes transmitting when to start the one of the cross slot mode or the same slot mode.

Example C1. A wireless device configured to communicate with a network node, the configured to, and/or comprising a radio interface and/or processing circuitry configured to:
  receive an application delay from the network node;
  start a same slot mode or a cross slot mode according to whether the application delay is zero or greater than zero.

Example C2. The wireless device of Example C1, wherein the wireless device, radio interface and processing circuitry are further configured to receive an indication of when to start the same slot mode or cross slot mode.

Example D1. A method implemented in a wireless device, the method comprising:
  receiving an application delay from the network node;
  starting a same slot mode or a cross slot mode according to whether the application delay is zero or greater than zero.

Example D2. The method of Example D1, further comprising receiving an indication of when to start the same slot mode or cross slot mode.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a wireless device for transitioning between a first minimum scheduling offset and a second minimum scheduling offset in which multiple numerologies are applied, the method comprising:
receiving an indication of an application delay from a network node, the application delay being based at least in part on a first subcarrier spacing, SCS, associated with a scheduling component carrier bandwidth part, BWP, and the application delay being associated with at least one of the first and second minimum scheduling offsets, the application delay being based at least in part on a minimum feasible application delay, Z, and when an associated physical downlink control channel, PDCCH, monitoring occasion comes after a specific symbol within a slot, the minimum feasible application delay is increased by a specific amount; and
starting to apply the second minimum scheduling offset based at least in part on the received application delay.

2. A wireless device for transitioning between a first minimum scheduling offset and a second minimum scheduling offset in which multiple numerologies are applied, the wireless device comprising processing circuitry, the processing circuitry configured to cause the wireless device to:
receive an indication of an application delay from a network node, the application delay being based at least in part on a first subcarrier spacing, SCS, associated with a scheduling component carrier bandwidth part, BWP, and the application delay being associated with at least one of the first and second minimum scheduling offsets, the application delay being based at least in part on a minimum feasible application delay, Z, and when an associated physical downlink control channel, PDCCH, monitoring occasion comes after a specific symbol within a slot, the minimum feasible application delay is increased by a specific amount; and
start to apply the second minimum scheduling offset based at least in part on the received application delay.

3. The wireless device of claim 2, wherein the application delay is further based at least in part on the first minimum scheduling offset, the first minimum scheduling offset being a currently applied minimum scheduling offset.

4. A method performed by a network node for transitioning between a first minimum scheduling offset and a second minimum scheduling offset in which multiple numerologies are applied, the method comprising:
determining an application delay based at least in part on a first subcarrier spacing, SCS, associated with a scheduling component carrier bandwidth part, BWP, the application delay being associated with at least one of the first and second minimum scheduling offsets, the application delay being based at least in part on a minimum feasible application delay, Z, and when an associated physical downlink control channel, PDCCH, monitoring occasion comes after a specific symbol within a slot, the minimum feasible application delay is increased by a specific amount.

5. The method of claim 4, wherein determining the application delay comprises:
determining the application delay based additionally on the first minimum scheduling offset, the first minimum scheduling offset being a currently applied minimum scheduling offset.

6. The method of claim 4, wherein determining the application delay for cross-carrier scheduling with a mixed numerology comprises:
when the first SCS associated with the scheduling component carrier BWP and a second subcarrier spacing, SCS, associated with a scheduled component carrier BWP are different, determining a normalized value for the first minimum scheduling offset of the scheduled component carrier BWP relative to the first SCS associated with the scheduling component carrier BWP.

7. The method of claim 6, wherein the normalized value, minK', is determined by:

$$\mathrm{min}K' = \mathrm{min}K \cdot \frac{2^{\mu_{PDCCH}}}{2^{\mu_{PDSCH}}}$$

wherein minK is a currently applied minimum scheduling offset;
$\mu_{PDCCH}$ is associated with the first SCS, the first SCS being associated with a scheduling physical downlink control channel, PDCCH; and
$\mu_{PDSCH}$ is associated with the second SCS, the second SCS being associated with a scheduled physical downlink shared channel, PDSCH.

8. The method of claim 4, further comprising:
transmitting an indication of the determined application delay to a wireless device.

9. The method of claim 4, wherein determining the application delay comprises:
determining the application delay based at least in part on a currently applied minimum scheduling offset in the scheduled component carrier BWP, the minimum feasible application delay, Z, of the scheduling component carrier BWP, the first SCS associated with the scheduling component carrier BWP and a second subcarrier spacing, SCS, associated with a scheduled component carrier BWP.

10. The method of claim 1, wherein the specific amount is 1 slot.

11. The method of claim 1, wherein the application delay is a currently applied minimum scheduling offset based at least in part on the first SCS associated with the scheduling component carrier BWP and a second subcarrier spacing, SCS, associated with a scheduled component carrier BWP.

12. The method of claim 1, wherein the application delay indicates when to start applying the second minimum scheduling offset after a change indication is received by a wireless device, the change indication indicating to apply a new minimum scheduling offset.

13. The method of claim 12, further comprising:
receiving the change indication via a downlink control information, DCI, message.

14. The method of claim 1, wherein the application delay is based at least in part on a currently applied minimum scheduling offset in the scheduled component carrier BWP, the minimum feasible application delay, Z, of the scheduling component carrier BWP, the first SCS associated with the scheduling component carrier BWP and a second subcarrier spacing, SCS, associated with a scheduled component carrier BWP.

15. The method of claim 1, wherein the application delay is further based at least in part on the first minimum scheduling offset, the first minimum scheduling offset being a currently applied minimum scheduling offset.

16. The method of claim 1, wherein the application delay corresponds to converting between a second scheduling mode and a first scheduling mode, the first and second scheduling modes being different at least in the respective minimum scheduling offset.

17. The method of claim 16, wherein the second scheduling mode is a cross-slot mode in which the minimum scheduling offset is greater than zero, and the first scheduling mode is a same slot mode in which the minimum scheduling offset parameter is equal to zero.

18. The method of claim 1, wherein:
the application delay is for cross-carrier scheduling with a mixed numerology; and
when the first SCS associated with the scheduling component carrier BWP and a second subcarrier spacing, SCS, associated with a scheduled component carrier BWP are different, the application delay being further based at least in part on a normalized value for the first minimum scheduling offset of the scheduled component carrier BWP relative to the first SCS associated with the scheduling component carrier BWP.

19. The method of claim 18, wherein the normalized value, minK', is determined by:

$$minK' = minK \cdot \frac{2^{\mu_{PDCCH}}}{2^{\mu_{PDSCH}}}$$

wherein minK is a currently applied minimum scheduling offset;
$\mu_{PDCCH}$ IS associated with the first SCS, the first SCS being associated with a scheduling physical downlink control channel, PDCCH; and
$\mu_{PDSCH}$ IS associated with the second SCS, the second SCS being associated with a scheduled physical downlink shared channel, PDSCH.

20. The method of claim 1, wherein the application delay is based at least in part on a type of physical downlink control channel, PDCCH, monitoring case.

* * * * *